(12) United States Patent
Bürger et al.

(10) Patent No.: US 9,127,862 B2
(45) Date of Patent: Sep. 8, 2015

(54) CONNECTING SYSTEM FOR A LINE TUBE, WHICH CAN BE PIVOTED ABOUT A ROTATION AXIS, OF A SOLAR-THERMAL INSTALLATION

(75) Inventors: Stefan Bürger, Baunatal (DE); Francisco Ortiz Vives, Vellmar (DE)

(73) Assignee: Senior Berghöfer GmbH, Kassel (DE)

( * ) Notice: Subject to any disclaimer, the term of this patent is extended or adjusted under 35 U.S.C. 154(b) by 237 days.

(21) Appl. No.: 13/058,586

(22) PCT Filed: Aug. 11, 2009

(86) PCT No.: PCT/EP2009/060375
§ 371 (c)(1),
(2), (4) Date: May 5, 2011

(87) PCT Pub. No.: WO2010/018166
PCT Pub. Date: Feb. 18, 2010

(65) Prior Publication Data
US 2011/0291405 A1    Dec. 1, 2011

(30) Foreign Application Priority Data
Aug. 14, 2008  (DE) .......................... 10 2008 037 711

(51) Int. Cl.
| | |
|---|---|
| F16L 27/10 | (2006.01) |
| F24J 2/46 | (2006.01) |
| F24J 2/14 | (2006.01) |
| F24J 2/54 | (2006.01) |

(52) U.S. Cl.
CPC *F24J 2/4636* (2013.01); *F24J 2/14* (2013.01); *F24J 2/4647* (2013.01); *F24J 2/541* (2013.01); *Y02E 10/45* (2013.01); *Y02E 10/47* (2013.01)

(58) Field of Classification Search
USPC ............. 285/148.3, 134.1, 135.1, 135.4, 223, 285/425, 272
See application file for complete search history.

(56) References Cited

U.S. PATENT DOCUMENTS

| | | | | |
|---|---|---|---|---|
| 700,378 | A | * | 5/1902 | Schmidt et al. ................. 285/64 |
| 2,068,876 | A | * | 1/1937 | Snyder, Jr. .................... 285/223 |
| 2,256,388 | A | * | 9/1941 | Fentress ......................... 285/61 |
| 3,860,978 | A | * | 1/1975 | Wirth ............................... 4/679 |
| 4,078,549 | A | | 3/1978 | McKeen et al. |
| 4,218,812 | A | * | 8/1980 | Jonsson ..................... 29/402.12 |
| 4,484,568 | A | | 11/1984 | Witt |

(Continued)

FOREIGN PATENT DOCUMENTS

| | | |
|---|---|---|
| DE | 3900203 A1 | 7/1990 |
| DE | 102007025209 A1 | 12/2008 |

(Continued)

*Primary Examiner* — Aaron Dunwoody
(74) *Attorney, Agent, or Firm* — The Webb Law Firm

(57) ABSTRACT

A connecting system is accordingly provided for a line tube, which can be pivoted about a rotation axis of a solar-thermal installation, which line tube is filled with a carrier fluid, wherein the line tube extends between two ends and is connected, for transportation of the carrier fluid, at a first end via a flexible tube connection to a fixed-position fixed line and at its second end via at least one connection means to a further line tube. According to the invention, the line tube is supported such that the flexible tube connection experiences only forces acting at right angles to the rotation axis, and the connection means experiences only forces acting parallel to the rotation axis.

10 Claims, 10 Drawing Sheets

(56) References Cited

U.S. PATENT DOCUMENTS

| | | | |
|---|---|---|---|
| 4,934,324 A | 6/1990 | Lenz | |
| 5,024,211 A | 6/1991 | Winzen | |
| 5,195,784 A * | 3/1993 | Richter | 285/61 |
| 5,803,506 A * | 9/1998 | Argersinger et al. | 285/14 |
| 7,195,284 B2 * | 3/2007 | Garton et al. | 285/223 |
| 2010/0213704 A1 * | 8/2010 | Burger et al. | 285/223 |

FOREIGN PATENT DOCUMENTS

| | | |
|---|---|---|
| DE | 102007048745 A1 | 4/2009 |
| EP | 1998120 A2 | 12/2008 |

* cited by examiner

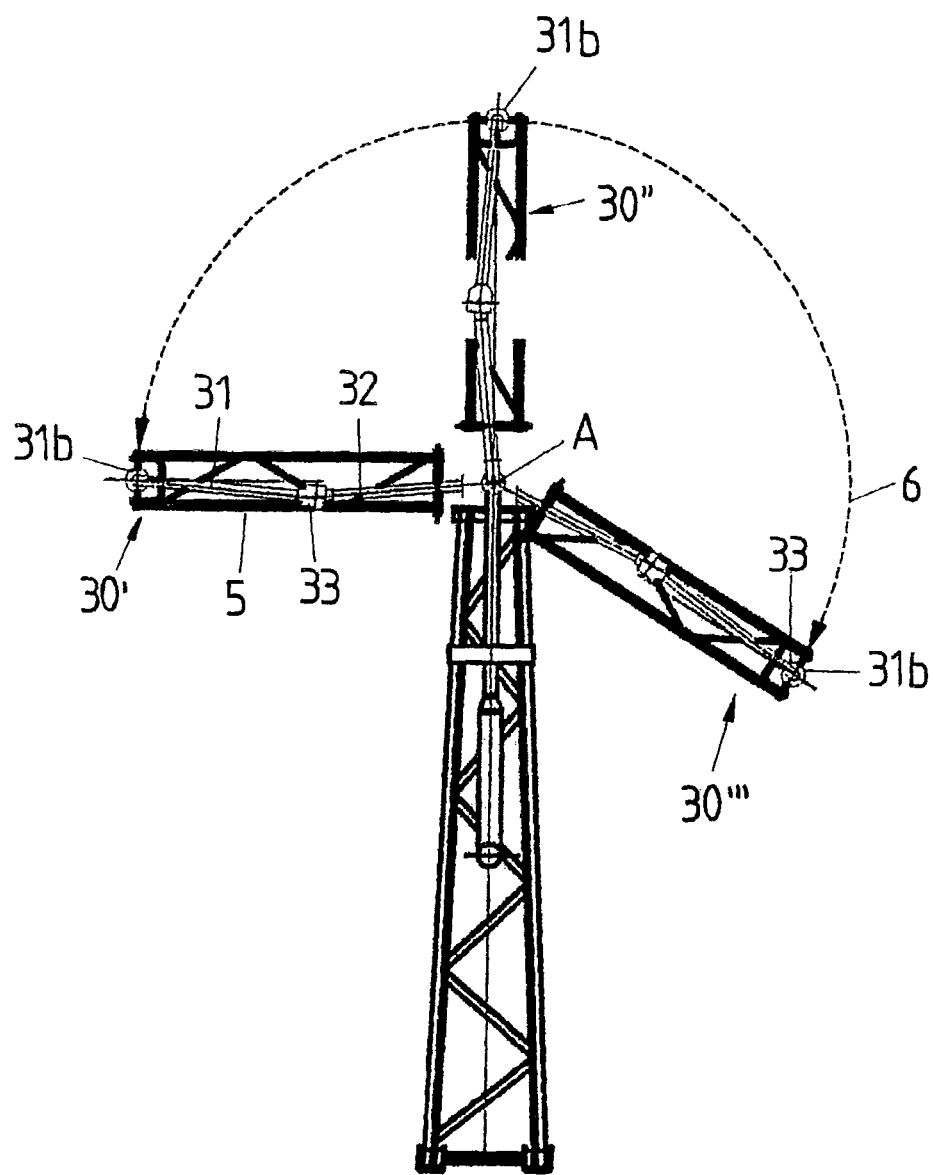

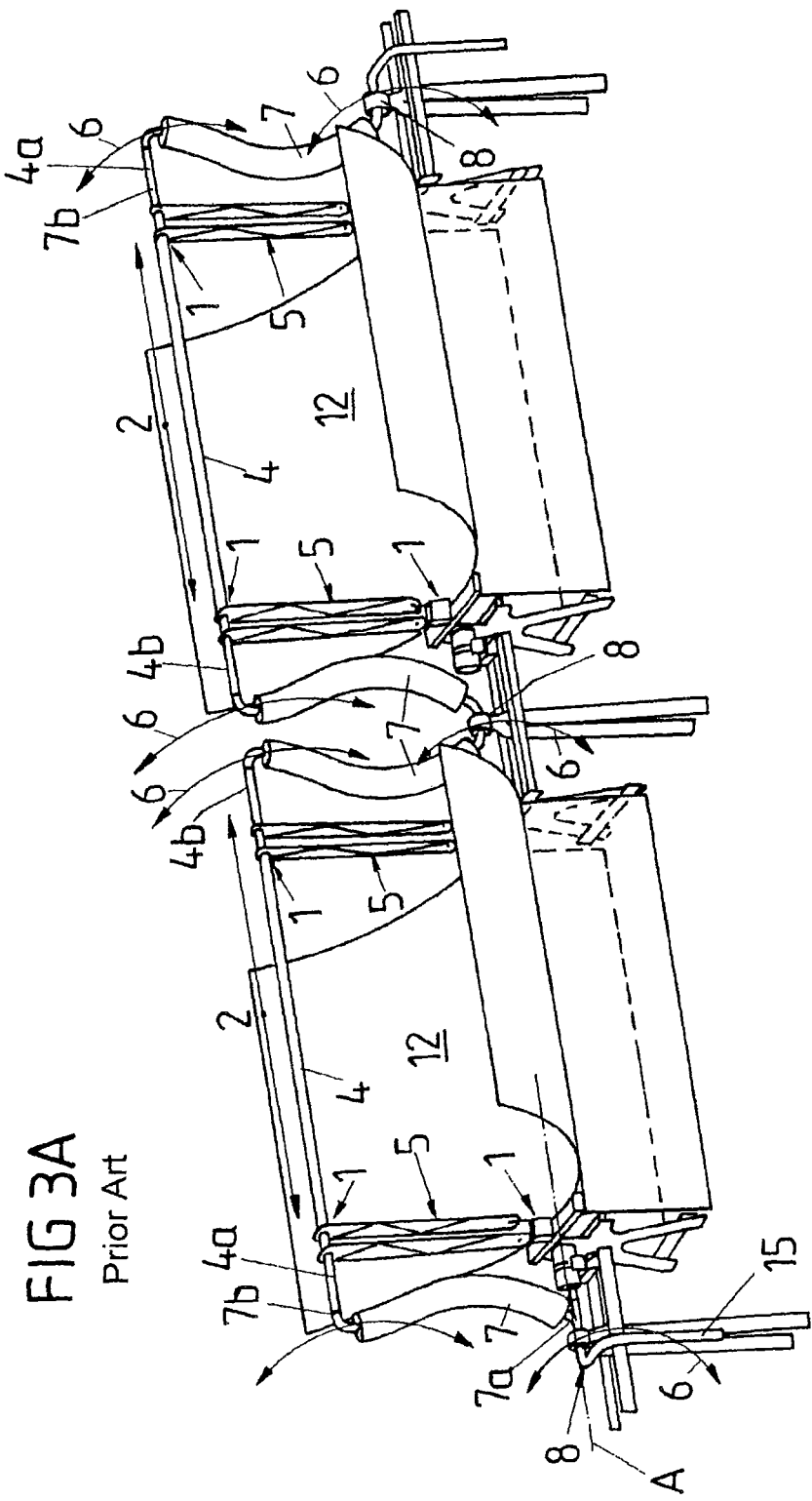

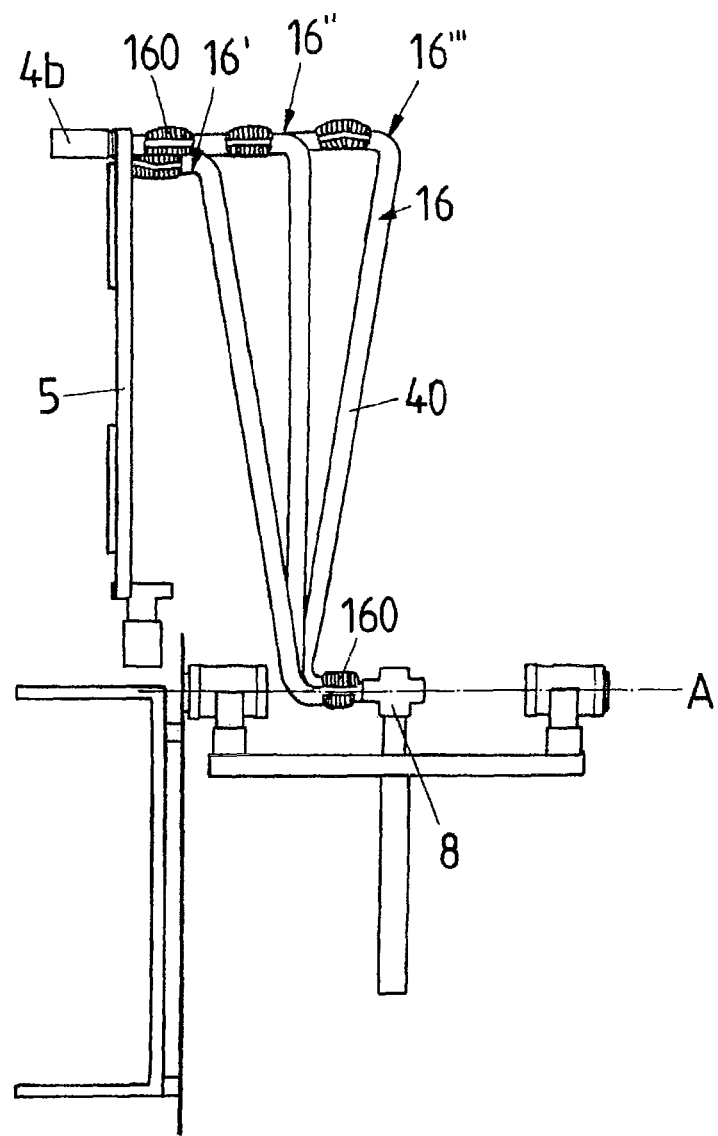

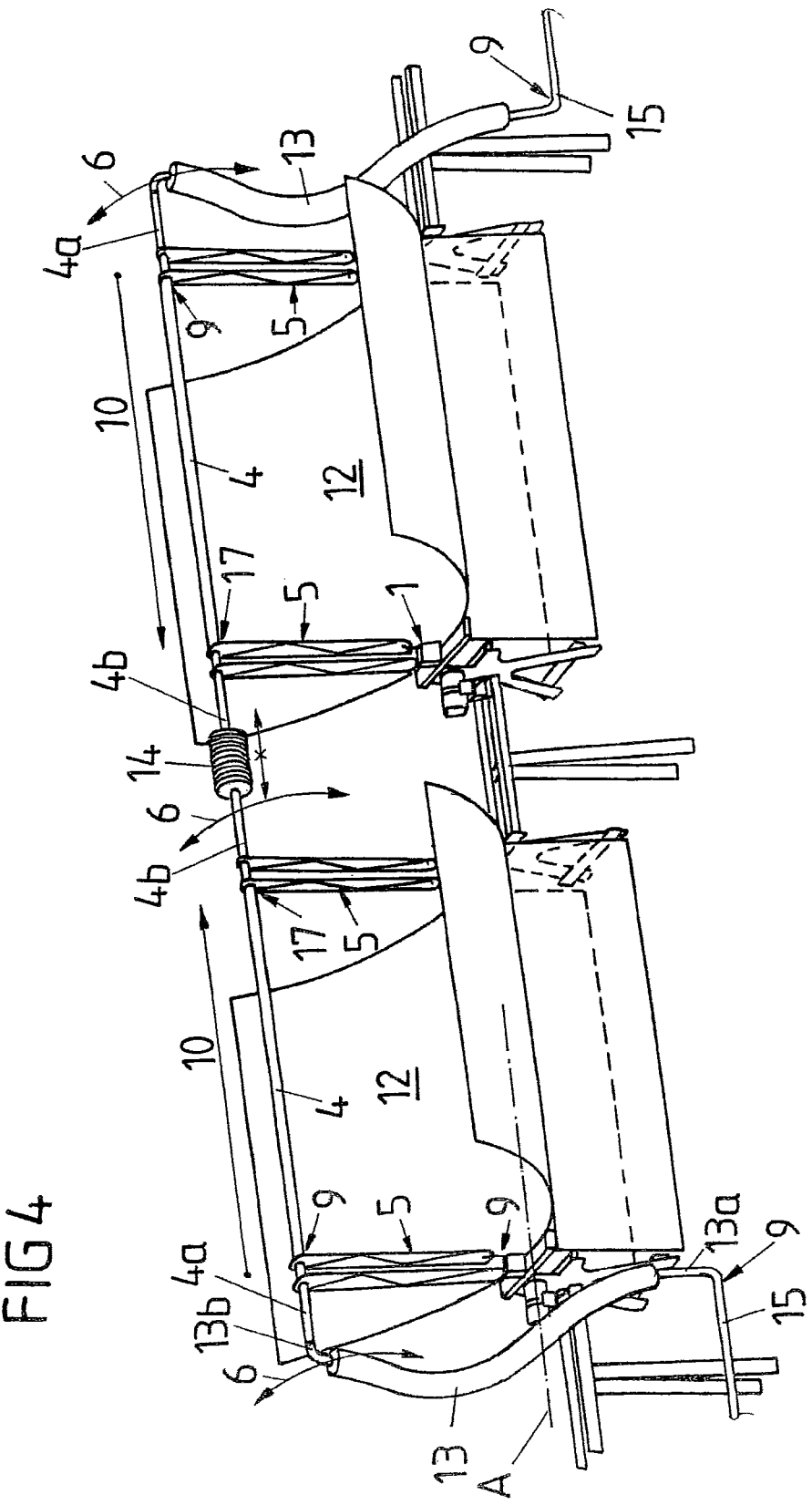

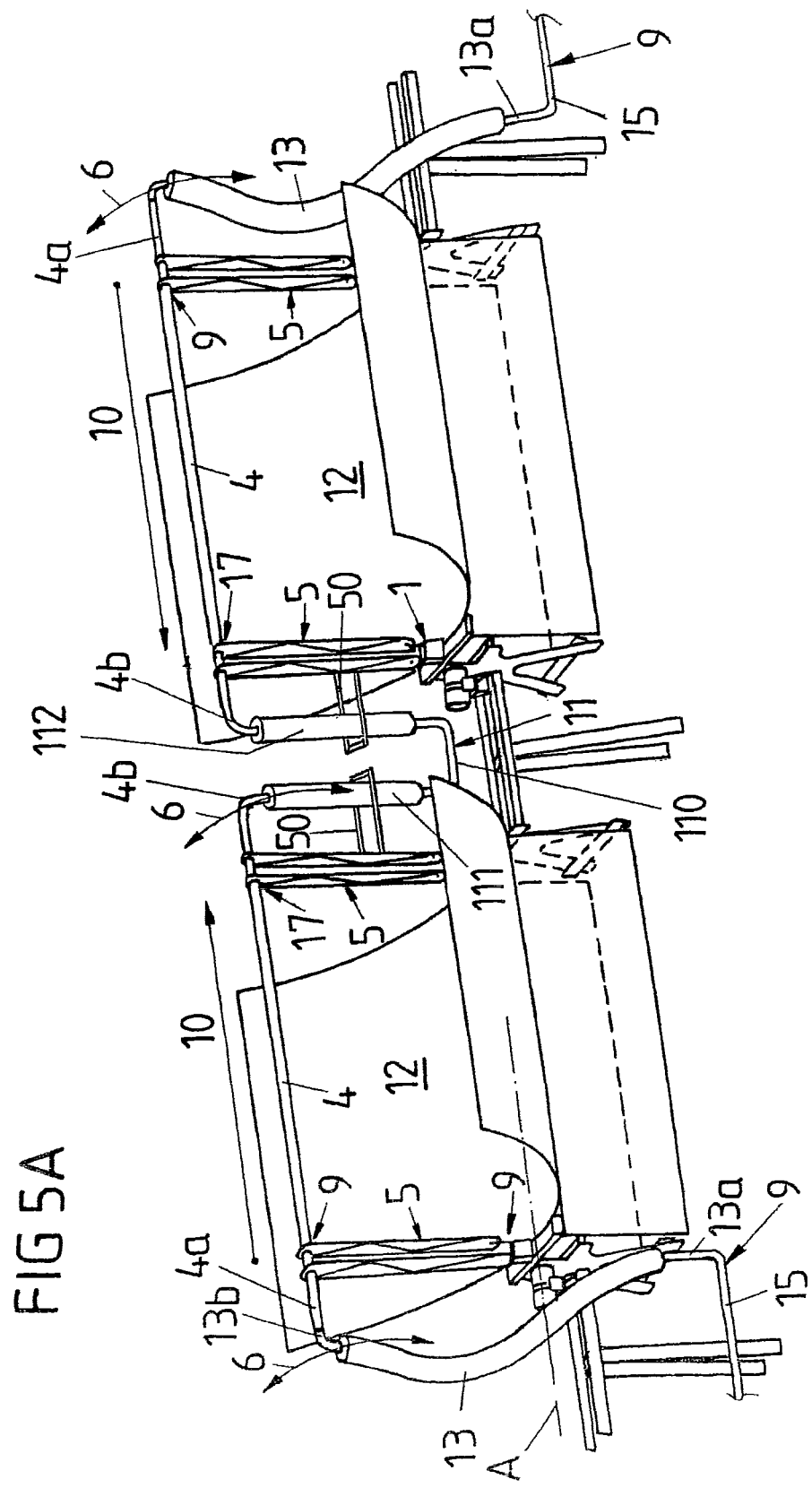

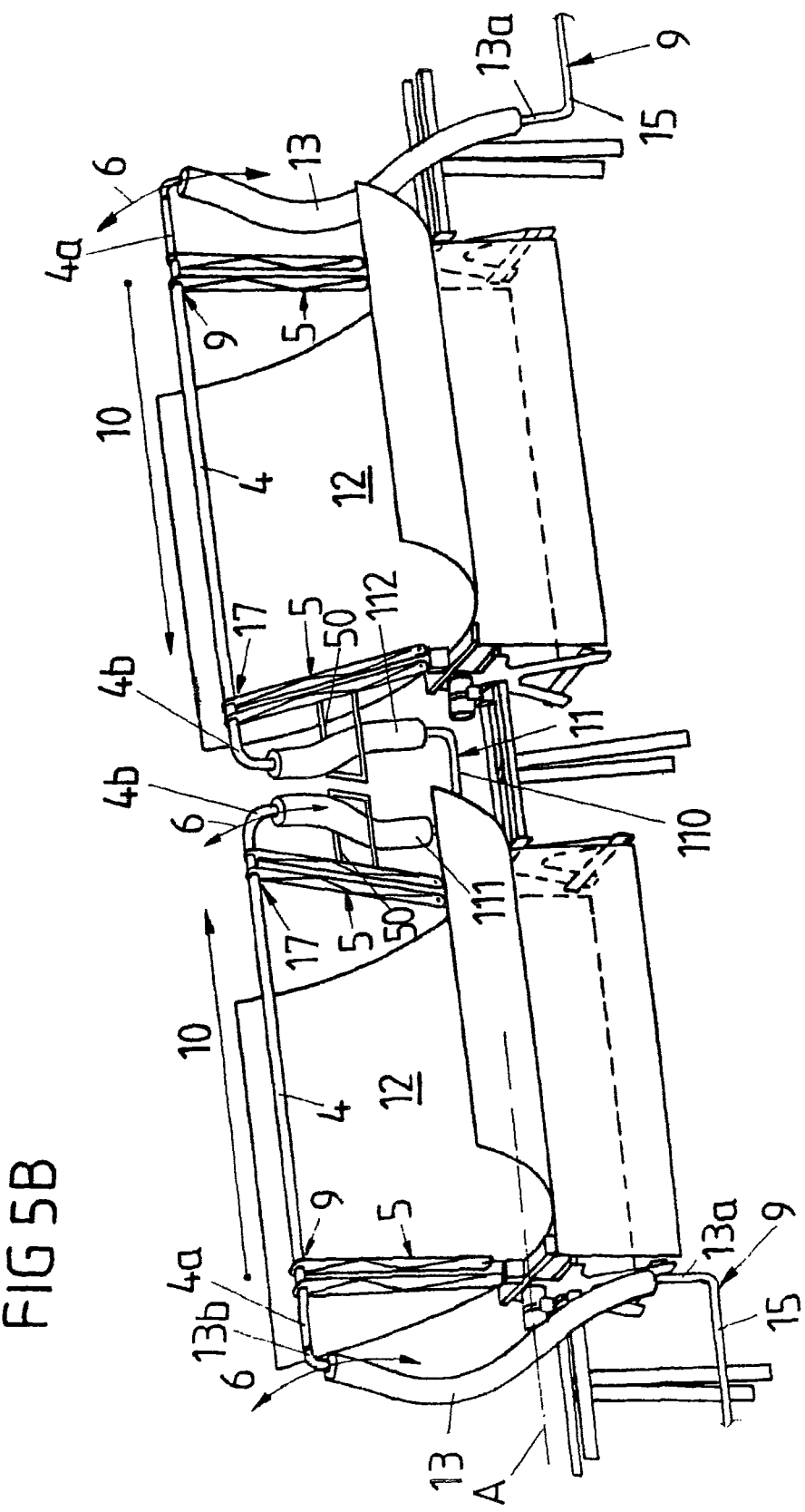

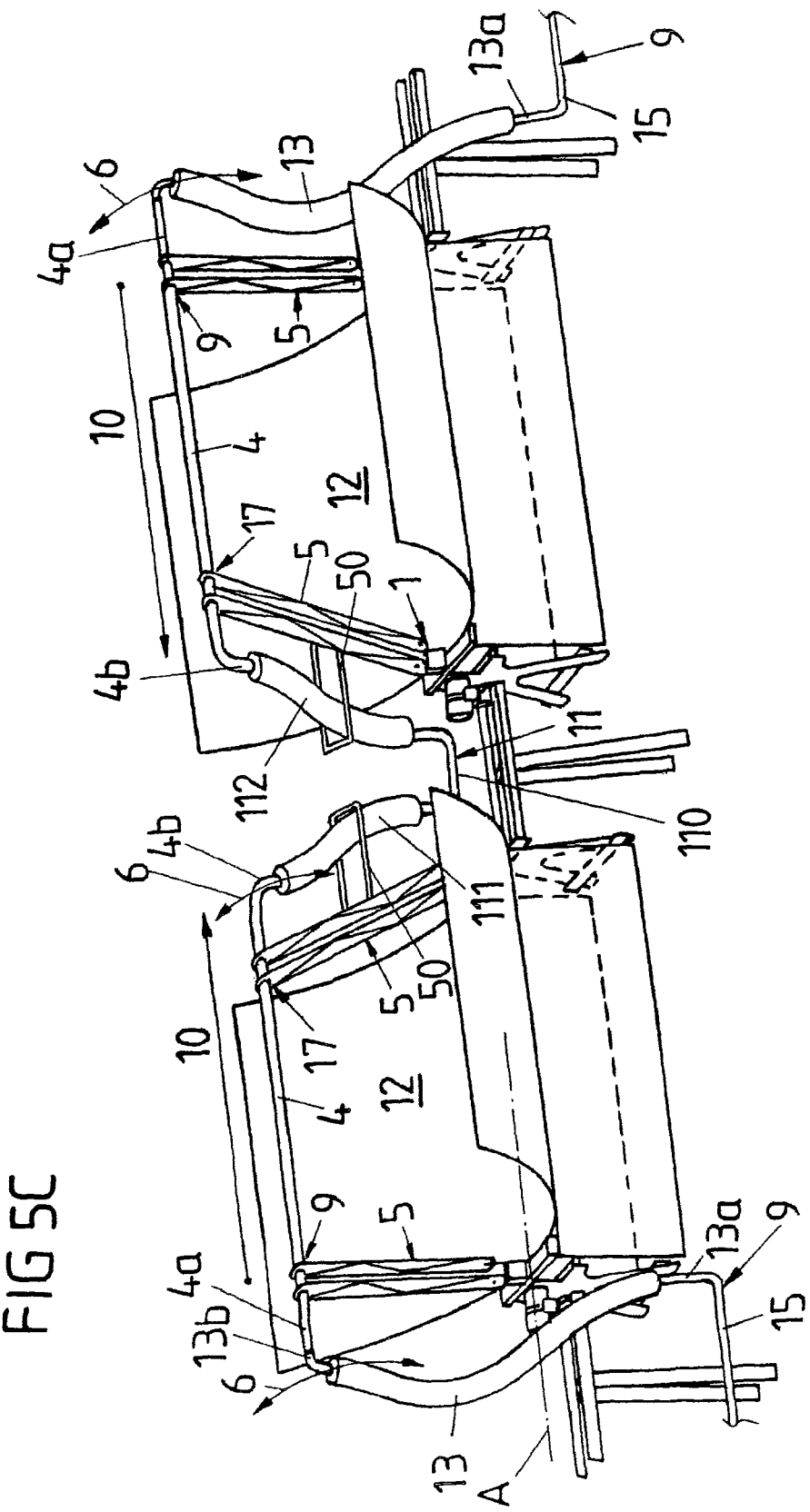

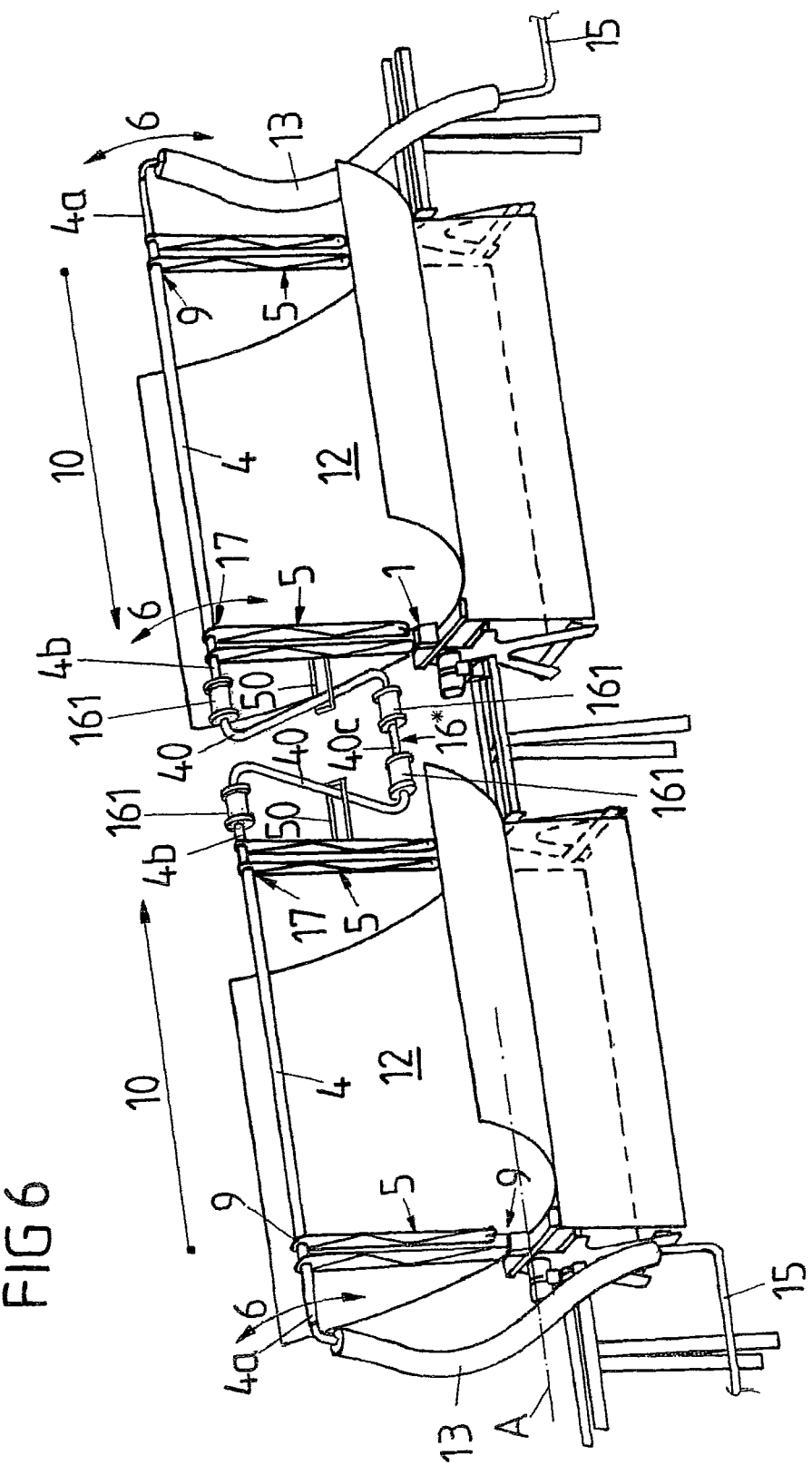

CONNECTING SYSTEM FOR A LINE TUBE, WHICH CAN BE PIVOTED ABOUT A ROTATION AXIS, OF A SOLAR-THERMAL INSTALLATION

BACKGROUND OF THE INVENTION

1) Field of the Invention

This invention relates to a connecting system for a line tube, which can be pivoted about a rotation axis, of a solar-thermal installation.

2) Description of the Prior Art

For an environmentally friendly energy generation, solar-thermal power plants are used now to an increasing extent. Such power plants usually include solar collectors, such as parabolic mirrors. With these solar collectors the solar radiation is collected and via receiver tubes or absorber tubes released into a carrier fluid, e.g. thermal oil. Via these absorber tubes and line tubes connected therewith the carrier fluid richer in energy then is transported. Inside the system or the line tubes, temperatures of 500° C. or more can be reached.

Since the solar collectors must be designed to be movable due to the apparent movement of the sun, the line tubes conveying the hot and pressurized carrier fluid often must also be pivotable. They are, however, always connected with stationary lines for passing on the carrier fluid. Due to the high temperatures and the high pressures, high demands consequently are placed on the connection between the individual parts of a solar-thermal installation.

The German Patent Application 10 2007 048 745 for example proposes an apparatus by means of which a perfect movability of the solar collectors is ensured at high temperatures and/or pressures. A flexible tube connection is arranged between a fixed line and an absorber tube, and there is provided a means for connecting the flexible tube line with the absorber tube with zero torque and/or zero force.

While the installations operated with thermal oil have so far been limited to a maximum operating temperature of 400° C. and a maximum operating pressure of 40 bar, novel solar-thermal installations are designed for operation with steam at 500° C. and at an operating pressure of 120 bar, in order to increase the effectiveness and the process efficiency.

Because of this extreme pressure load at a very high temperature and the involved risks and the high wear, other fluids or gases are considered as carrier fluid.

For example, there can also be used gases or liquefied salts which provide for transportation of the solar heat from an absorber tube to the power plant at temperatures of 500° C.

The increase in temperature to 500° C., however, causes a distinctly higher longitudinal expansion both of the line tubes of a solar-thermal installation and especially of the absorber tubes heated by the solar collectors and also of the tube lines in the fixed network. In addition, a more resistant seal must be used in operation with liquid salts. As a result, the previously employed flexible connections reach their application limits in the commonly used arrangement.

SUMMARY OF THE INVENTION

Therefore, it is the problem underlying the invention to create a connecting system for a line tube of a solar-thermal installation, which is pivotable about a rotation axis and which reaches a longer and safer service life even at high temperatures and/or pressures of a carrier fluid present in the line tube.

In accordance with the invention, this problem is solved with the connecting system described herein.

Accordingly, there is provided a connecting system for a line tube of a solar-thermal installation, which is pivotable about a rotation axis and which is filled with a carrier fluid, wherein the line tube extends between two ends and for transportation of the carrier fluid is connected at a first end via a flexible tube connection to a stationary fixed line and at its second end via at least one connection means to a further line tube. In accordance with the invention, the line tube is mounted such that the flexible tube connection only experiences forces acting vertical to the rotation axis and the connection means only experiences forces acting parallel to the rotation axis.

In this way, the elements connected with the line tube—the flexible tube connection and the connection means—are protected against the direct influence of biaxial movements.

Thus, the flexible tube connection can optimally be designed at its first end for a bending load vertical to the rotation axis of the line tube, which acts on the same as a result of the pivoting movement of the line tube and the fixation of the tube connection at the stationary fixed line. There is no load acting on the tube connection due to a force parallel to the rotation axis, e.g. due to a thermal expansion of the line tube. A complex multiaxial stress condition thereby is avoided and the tube connection is not additionally subjected to a torsional load.

At the same time, a force occurring parallel to the rotation axis acts on a component connected with the line tube, since the line tube only is supported at the second end. At this end, the connection means for connecting the one line tube with a further line tube hence can specifically be designed for a force compensation along this one direction of action. Since the further line tube e.g. as part of a further solar collector unit likewise is pivotable about the common rotation axis, the connection means thus experiences no bending vertical to the rotation axis or need not withstand such load.

In accordance with the invention, a clear separation of the occurring forces thus is achieved at the respective ends of the pivotable line tube, so that the tube connection at the one end and the connection means at the other end only is loaded by the intended movement under operating conditions and there is no risk of stresses due to torsion.

Especially at desired operating temperatures of 500° C. and a pressure of 120 bar inside the pivotable line tube, these stresses would hardly or only with difficulty be manageable for a durable and safe design of the connecting system.

It is regarded as particularly advantageous when the line tube is mounted such that in the case of a thermal expansion along the direction of extension of the line tube, the line tube can expand only in direction of its second end.

Thus, the line tube can be fixed in its direction of extension in the region of its first end and can slidingly be guided in the region of its second end. In other words, the line tube is firmly clamped in axial direction with its first end at a fixed point. The fixed point preferably is located directly before the coupling to the flexible tube connection. At the opposite end, the line tube is "loosely" mounted such that it is supported or clamped in radial direction, but can expand further along its direction of extension.

For this purpose, the line tube preferably is guided in a plain bearing at its second end. This allows a longitudinal thermal expansion of the line tube, which due to the high operating temperatures definitely can lie in the order of 70 cm.

Alternatively or in addition, it is provided that in the region of its two ends the line tube is each connected with a connection structure which is pivotally mounted about the rotation axis together with the line tube, and wherein the connection structure facing the connection means additionally is also pivotally mounted along the rotation axis.

In the case of an arrangement of the absorber tube above a parabolic mirror of a solar-thermal installation this means for example that the two connection structures both are pivotally mounted about a common rotation axis together with the parabolic mirror and that at the same time a connection structure alone is pivotally mounted along the rotation axis, possibly via a separate pivot bearing. In this way, pivoting the connection structure along the rotation axis also can ensure that the connection means experiences forces acting almost only parallel to the rotation axis. Due to the pivoting movement of the connection structure, these forces are passed on to the connection means for compensation. Ideally, the pivot radius along the rotation axis is many times greater than the expansion or contraction of the line tube, so that due to the pivoting movement of the connection structure no relevant transverse forces are acting on the line tube.

In a development it can then be provided that due to a thermal expansion of the line tube along the direction of extension of the line tube the connection structure pivotally mounted along the rotation axis can be pivoted along the rotation axis. In other words, the one connection structure is pivoted along the rotation axis only due to the expansion or contraction of the line tube as a result of a change in temperature.

Due to the bearing in accordance with the invention, a specific load is created at the respective ends of the line tube without torsion superposition, so that comparatively simple components can be used which permanently withstand the specific load case. No expensive constructions are necessary, with which it must be ensured for example between fixed line and line tube that when swivelling the line tube both an expansion and a rotation of the line tube can be compensated. For such a compensation of both expansion and rotation, elaborately sealed connecting systems mostly are used, whose seals do not permanently withstand the given loads.

In accordance with the invention, however, it now becomes possible that inside the connecting system, proceeding from the fixed line up to the further line tube, no seals are necessary. Thus, the connecting system of the invention would also be suitable for a chemically more aggressive carrier fluid, like the liquid salts already explained above, for which e.g. at an operating temperature of 500° C. no resistant seals are known yet.

As tube connection at the first end of the line tube a flexible metal hose known from the prior art might be used, which upon pivoting the line tube compensates the rotation, i.e. is bent vertical to the rotation axis. As it experiences no forces parallel to the rotation axis, no torsional stresses are produced, which can accelerate the material fatigue. Additional constructions for force compensation, such as joints, are not necessary either and the flexible metal hose also can be used for higher temperatures and pressures of the carrier fluid than so far.

In accordance with a development, the fixed line additionally is mounted or fixed such that in the case of an expansion or contraction it is only expanded or shortened at an end opposite the flexible tube connection. In this way, it is ensured that due to the fixed line either no additional force component acts on the flexible tube connection parallel to the rotation axis and produces a torsional stress.

For the force absorption parallel to the rotation axis, especially e.g. as a result of the thermal expansion of the line tube, which only can occur at the second end, there can also be used already known connection means. For example, the same must only be suitable for compensating the expansion of the line tube and experience no additional forces transverse thereto.

In one configuration variant it is provided that the at least one connection means is an axial compensator provided between the connected line tubes, in particular an axial compensator loaded by external pressure.

Alternatively, a configuration variant is conceivable, in which at least the one connection means includes at least one flexible metal hose which is arranged in a U-shape between the two connected line tubes. Only one metal hose can be provided in a U-shape, wherein the two legs of the U-shape are substantially vertical to the rotation axis. In accordance with a development, two flexible interconnected metal hoses can be provided for an improved compensation of the thermal expansion, which each form a leg of the U-shape consisting of two legs.

In a further alternative configuration variant at least the one connection means is a compensator joint system, comprising tube lines connected by compensators.

To ensure that the flexible metal hose or one or more of the tube lines between the interconnected line tubes are also moved around the one rotation axis during the pivoting movement, it is preferred that they are guided in a holding frame which performs the pivoting movement about the rotation axis along with the line tube. This is of course only possible in a simple way, since neither the metal hose provided here nor as an alternative the tube lines are subjected to a bending load transverse to the rotation axis.

In principle, it is regarded as advantageous when a used flexible metal hose constitutes a multiwall corrugated metal hose. This is true both for the use as tube connection at the first end of the line tube and for the use as connection means at the second end.

As already briefly outline above, the line tube in a particularly preferred embodiment is an absorber tube of the solar-thermal installation, in which energy is supplied to the carrier fluid via solar collectors.

The solar-thermal installation in particular can include parabolic trough mirrors which are pivotable about the rotation axis. Thus, so-called parabolic trough power plants are created, whose solar collectors include parabolic trough mirrors and receiver tubes (also called absorber tubes) arranged therein. With these parabolic trough mirrors the solar radiation is collected and via the absorber tubes released to the carrier fluid present therein.

BRIEF DESCRIPTION OF THE DRAWINGS

Further features and advantages of the invention will become apparent from the following description of embodiments with reference to the Figures.

In the drawing:

FIGS. 1-3B show connecting systems known from the prior art for a solar-thermal installation with parabolic trough mirrors as part of the solar collector unit;

FIG. 4 shows a configuration variant of the connecting system of the invention with an axial compensator as connection means for connecting an absorber tube with a further absorber tube of a solar-thermal installation in a perspective side view;

FIGS. 5A-5C show a further configuration variant with a U-shaped arrangement of metal hoses as connection means in a configuration otherwise corresponding with FIG. 4;

FIG. 6 shows a further configuration variant with a compensator joint system as connection means in a configuration otherwise corresponding with FIG. 4.

DETAILED DESCRIPTION OF THE PREFERRED EMBODIMENT

Figure 1:
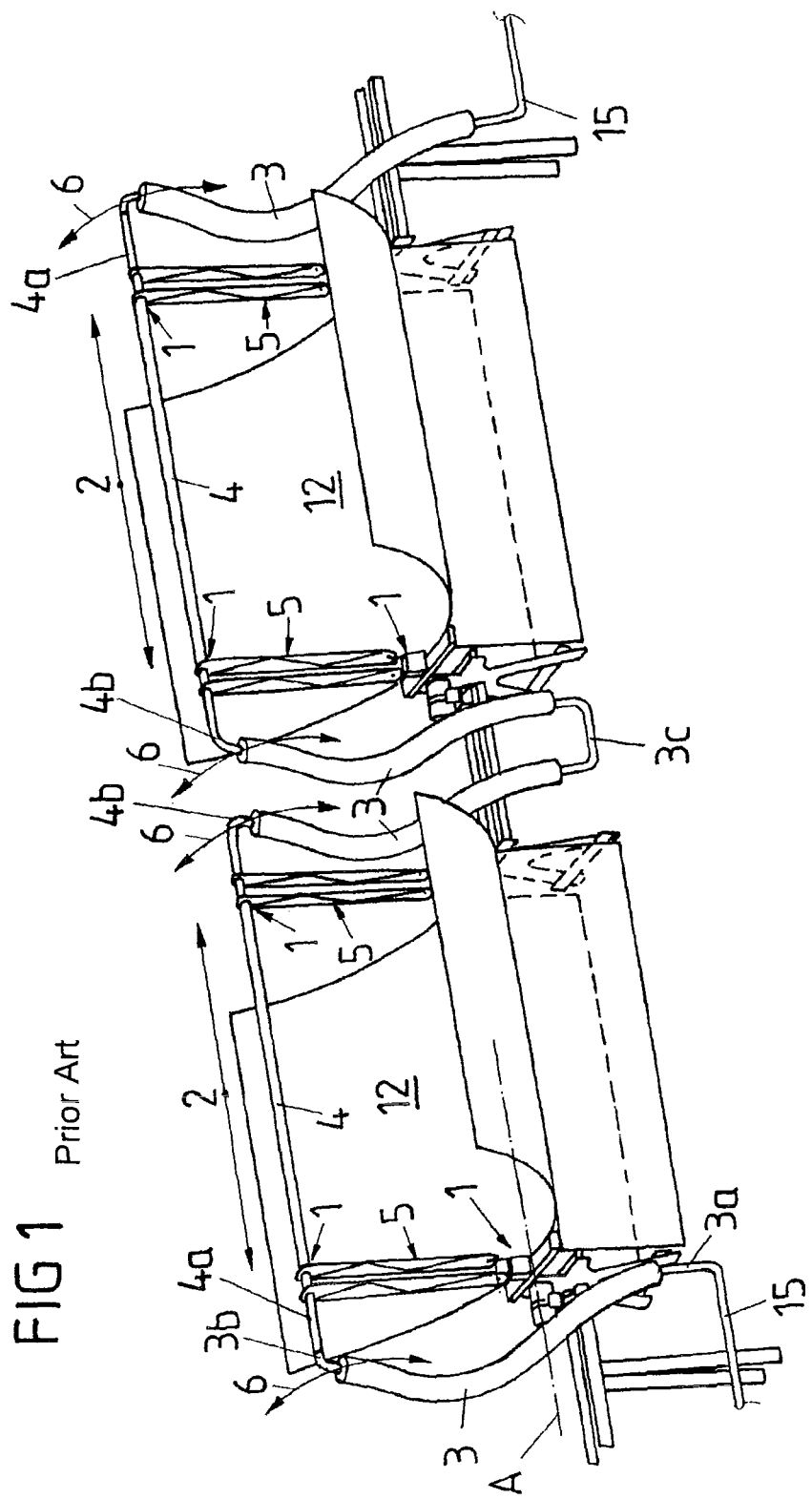

In the following Figures, the same reference numerals always are used for corresponding elements. Correspondingly, repeatedly occurring elements designated with the same reference numerals are formed and arranged in the same manner, unless anything to the contrary is described.

FIG. 1 shows a solar-thermal installation with two parabolic trough mirrors 12 arranged in alignment one beside the other. The carrier fluid (e.g. oil, gases or liquefied salt) to be heated by the solar radiation is passed through absorber tubes 4 (also referred to as receiver tubes) as line tube in the sense of the invention, which substantially lie in the focal line of the parabolic trough mirrors 12. For this purpose, the respective absorber tube 4 is guided by a connection structure 5 above the curved surface of the parabolic trough mirrors 12 and mounted on the connection structure 5 with its two ends 4a, 4b located opposite each other. In the illustrated view, the connection structure 5 therefore rises up at two lateral edges of the parabolic trough mirrors 12, so that the parabolic trough mirror 12 is located therebetween.

Due to the apparent sun movement, the parabolic trough mirrors 12 of the solar-thermal installation must follow the changing position of the sun during the day and therefore can be pivoted about a rotation axis A along a pivoting movement 6. Including the thunderstorm parking position, at which the mirror surface of the parabolic trough mirror 12 is directed downwards, a pivoting movement 6 by about 270° is obtained. To ensure that the absorber tube 4 always remains in the focal line of the parabolic trough mirrors 12, it can also be pivoted about the rotation axis A together with the parabolic trough mirror 12.

Furthermore, the connection structure 5 each includes a pivot bearing 1 in the region of the parabolic trough mirror 12 and at the bearing point for the absorber tube 4, so that a longitudinal thermal expansion 2 of the associated absorber tube 4 parallel to the rotation axis A does not lead to a bending of the absorber tube 4 between the two connection structures 5, 5.

In the region of the first end 4a, the absorber tube 4 furthermore is connected with a stationary fixed line 15 via a flexible metal hose 3 as tube connection. This fixed line 15 is immovably fixed and cannot change its position when the absorber tube 4 is pivoted about the rotation axis A. The metal hose 3 thus is connected to the absorber tube 4 with one end 3b and to the fixed line 15 with another end 3a.

To ensure that even when pivoting the absorber tube 4 the hot and pressurized carrier fluid can be fed into the fixed line 15 and be passed on, the flexible metal hose 3 can be bent at least vertical to the rotation axis A along the pivoting movement 6.

Therefore, the metal hose 3 is formed and arranged such that during the pivoting movement 6 of the parabolic trough mirror 12 it performs a helical winding and unwinding movement. The introduction of force for bending the hose is effected at its one end 3b through the pivoting absorber tube 4 located in the focal point of the parabolic mirror 12. In the region of its ends 4a, 4b the absorber tube 4 is rotatably mounted on the connection structure 5 via one further pivot bearing 1 each, so that as little force as possible acts on the absorber tube 4 due to the pivoting movement 6. At the same time, an expansion of the absorber tube 4 is permitted in axial direction, i.e. in direction of extension of the absorber tube 4.

Between the two parabolic trough mirrors 12, the two absorber tubes 4, 4 each are also connected with a flexible metal hose 3 in the region of their respective end 4b. The two metal hoses 3 in turn are in contact with each other via a rigid connecting piece 3c, through which the carrier fluid can also be transported.

In addition to the pivoting movement 6 of the parabolic trough mirror 12, there must also be absorbed the thermal expansions of the connected tube lines, between the fixed tube line 15 on the one hand and the absorber tube 4 on the other hand, which act parallel to the rotation axis A or transverse to the pivot plane. With increasing temperature, the absorber tubes 4, 4 for example expand along their longitudinal extension in direction of both ends 4a and 4b and therefore have a bilateral thermal expansion 2.

At the two ends 4a, 4b the especially developed flexible metal hose 3 takes up all occurring movements.

The possibility for absorbing all movements transverse to the bending plane or parallel to the rotation axis A is limited, however, because they lead to torsional stresses in the metal hose 3, which must be added to the stresses caused by pressure at the high operating temperature and can effect a faster material fatigue.

Figure 2B:
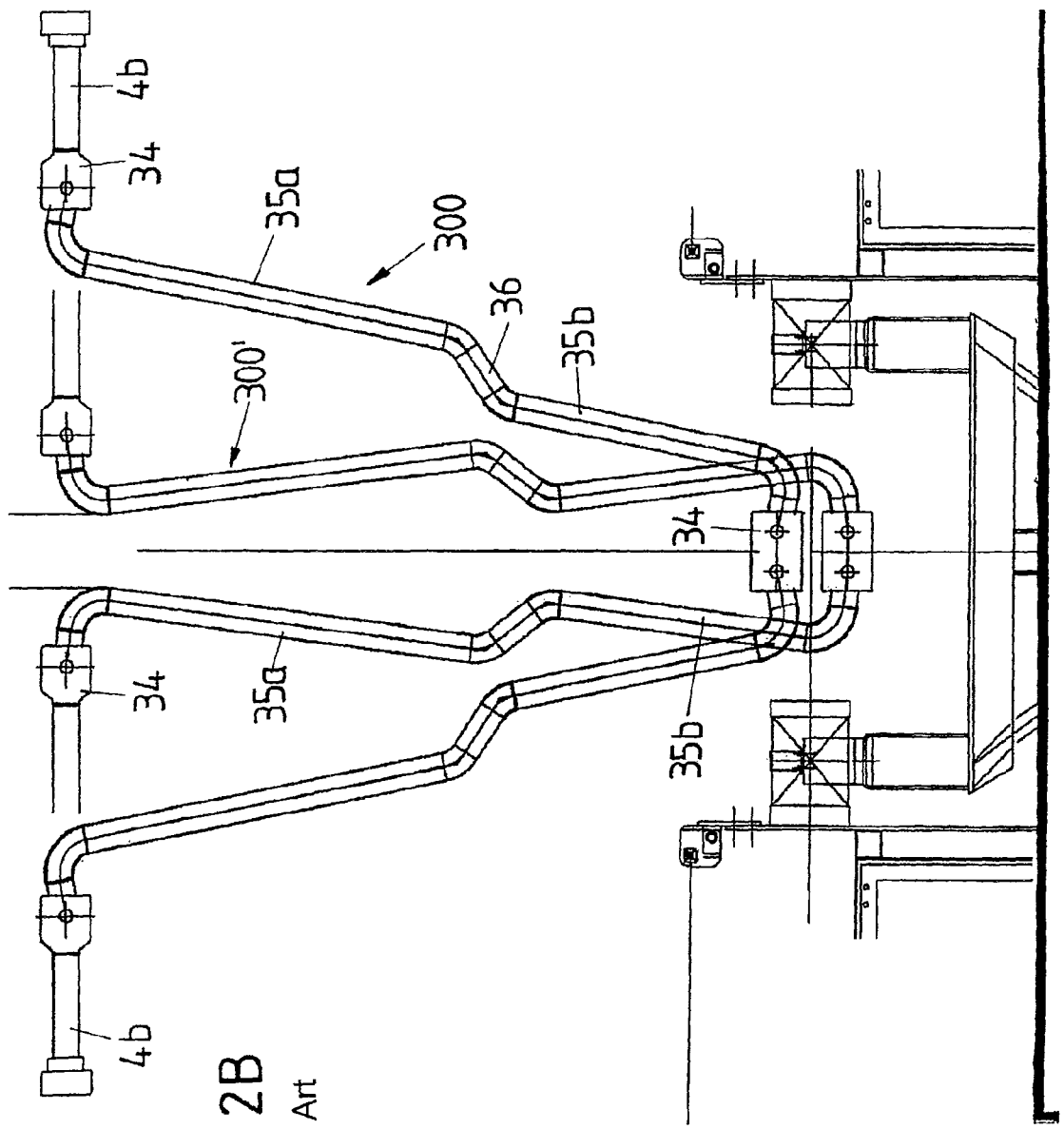

An alternative construction variant from the prior art is shown in FIGS. 2A and 2B.

Herein, FIG. 2A first of all shows a three-joint system which consists of individual intermediate tubes or tube segments 31 and 32, which are connected with each other via a tube joint 33. This three-joint system is used instead of the flexible metal hose 3 between the fixed line 15 and the absorber tube 4. Correspondingly, one of the intermediate tubes 31 also is connected with the absorber tube 4 at its end 31b.

FIG. 2A furthermore shows various positions 30', 30" and 30"' of the three-joint system at different degrees of pivoting movement of the absorber tube 4 with the connection structure 5 about the rotation axis A.

Analogously, FIG. 2B shows a basically similar configuration for the connection of two absorber tubes 4, 4. At the ends 4b of the absorber tubes 4, 4 a tube joint 34 each is provided, which is connected with a tube segment 35a. The same is adjoined by a transition portion 35, which serves for connection with a further tube segment 35b. Via an additional tube joint 34, the two tube segments 35b of the individual absorber tubes 4, 4 to be connected then are connected with each other.

With reference to the longitudinal expansion positions 300 and 300' as shown in FIG. 2B it can be seen how this construction compensates a longitudinal thermal expansion 2 of the absorber tubes 4, 4. The longitudinal expansion position 300 shows a cooler operating condition than the longitudinal expansion position 300'.

The tube joints 34 like the tube joints 33 are provided with spherical sealing heads which permit slight angular movements of the connected tube segments 31, 32 and 35a, 35b, respectively, relative to the absorber tube 4. The illustrated three-joint system, whose tube joints 33, 34 also are referred to as "ball joint" in this construction, hence can compensate linear movements. It thus performs the pivoting movement 6 and on a restricted scale also the thermal expansion 2 transverse to the pivot plane.

The tube joints 33, 34 however are provided with seals which thus are subjected to a wear during the rotation about the rotation axis A. Therefore, the illustrated constructions usually are employed for thermal oil as carrier fluid with a maximum operating temperature of 400° C. and an operating pressure of 23 bar. For the use of liquid salt at 500° C. as carrier fluid to be conducted, no suitable sealing material is available yet, which can permanently withstand the load as a result of the pivoting movement 6 and the thermal expansion 2. In addition, in the case of a greater demand for movement absorption, additional flexible elements such as the tube joints 33, 34 or the tube segments 31, 32 and 35a, 35b, respectively must be incorporated, whereby the construction becomes expensive and hardly mountable.

An alternative concept, which at least partly is already known from the German Patent Application 10 2007 048 745 and which is also usable for geometrically identical installations, at which steam is used as carrier fluid at 500° C. and a pressure of 120 bar, is shown in FIGS. 3A and 3B.

On the one hand, flexible metal hoses 7 bent or bendable at the ends 4a, 4b of the absorber tubes 4 in direction of the rotation axis A are used here, as shown in FIG. 3A. At their one end 7b, the same are non-rotatably connected with the end 4a of an absorber tube 4. However, they only compensate the longitudinal thermal expansion 2, since they are connected with a suitable rotary feedthrough 8 at their other end 7a. By means of this rotary feedthrough 8 a rotation or pivoting movement of the metal hose 7 about the rotation axis A and hence relative to the fixed line 15 connected to the rotary feedthrough 8 is possible.

Then, such rotary feedthrough 8 likewise connects two identically formed metal hoses 7, 7 between two absorber tubes 4, 4.

In an alternative configuration with a rotary feedthrough 8 it is possible corresponding to FIG. 3B to use a rigid, Z-shaped tube member 40, which is provided with compensators 160, instead of a flexible metal hose 7.

As shown in FIG. 3B, such compensator 160 similar to the tube joints 33 and 34 of FIGS. 2A and 2B permits a slight angular offset of the Z-shaped tube member 40 in the case of a longitudinal thermal expansion 2 of the absorber tube 4. Although the tube member 40 at one end is fixed in its position so as to be rotatable about the rotation axis A via the rotary feedthrough 8, a force acting on the tube member 40 parallel to the rotation axis A as a result of the thermal expansion 2 can be compensated.

In the cold condition a first position 16' shown in FIG. 3B is taken, in the heated condition a second position 16" is taken and in the hot condition a third position 16''' is taken. At the different positions 16', 16" and 16''' the tuber member 40 correspondingly is deflected relative to the fixed rotary feedthrough 8 to a different extent at its end connected with the end 4b of the absorber tube 4 parallel to the rotation axis A. The resulting angular offset is compensated by the compensators 160, which are arranged between the end 4b and the tube member 40 and between the tube member 40 and the rotary feedthrough 8, respectively.

However, this construction concept also involves the difficulty that at the present time no seals are known for the rotary feedthroughs 8, which are permanently resistant to liquid salt or comparable media as carrier fluid at 500° C.

The present invention solves the described problem by an arrangement of well-tried elements which are suitable for the operating conditions and in particular have a long-term resistance at said operating parameters when using salt or alternative media as liquid or gaseous heat transfer media.

For this purpose, the absorber tube 4 is mounted such that each element only is subjected to the load for which it is optimally suited on a long-term basis. In the present example, this is achieved by a selective arrangement of fixed points or fixations 9 and plain bearings 17, which protect the components connected to the absorber tube 4 against the influence of biaxial movements.

As shown in FIG. 4, a flexible metal hose 13 is used as tube connection between the end 4a of the absorber tube 4 and the fixed line 15. The same substantially corresponds with the metal hose 3 of FIG. 1 and for example might by a corrugated metal hose.

In contrast to the arrangement of FIG. 1, however, both in the region of the end 13a of the metal hose 13, to which the fixed line 15 is connected, and in the region of the opposite end 13b, measures have now been taken to prevent the metal hose 13 from being loaded with forces which act parallel to the rotation axis A. For this purpose, axial fixations 9 are provided along the tube axes of the fixed line 15 and of the absorber tube 4, so that on the one hand the fixed line 15 cannot expand in direction of the end 13a and the absorber tube 4 cannot expand in direction of the end 13b of the metal hose 13 or be contracted in the opposite direction. This will be achieved for example by corresponding bearings, holders or stops, which cooperate e.g. with shaft shoulders of the absorber tube 4, which are known in principle.

In the present case, for example, an axial fixation 9 additionally is provided in the region of a pivot bearing 1 known from FIGS. 1 and 3A and 3B, with which the absorber tube 4 is rotatably mounted on the connection structure 5 in the region of its end 4a, as shown in FIG. 4 and subsequently in FIGS. 5A, 5B and 6. This axial fixation 9 forms a fixed point for the absorber tube 4, so that in the case of a longitudinal thermal expansion, which at the high operating temperatures very well can lie in the range of 70 cm and more, the absorber tube 4 only can be extended in direction of the end 4b, which is located opposite the metal hose 13. Contrary to the bilateral longitudinal thermal expansion 2 of the absorber tube 4 of the preceding Figures, only a unilateral longitudinal thermal expansion 10 hence is permitted via plain bearings 17, as will be explained in detail below.

The connection structure 5 associated to the end 4a likewise is provided with a fixation 9 in the region of the parabolic trough mirror 12, so that swivelling this connection structure 5 transverse to the rotation axis A is not possible.

Analogously, a fixed point is provided by an axial fixation 9 at the fixed line 15. The absorber tube 4 and the fixed line 15 thus each can expand only in the direction facing away from the metal hose 13.

Thus, both on the side of the fixed line 15 and on the side of the absorber tube 4 fixed points are arranged, due to which the metal hose 13 experiences no movements and hence no forces transverse to its bending plane and/or parallel to the rotation axis A.

During the pivoting movement 6 of the parabolic mirror 12 by up to 270°, the metal hose 13 thus is arranged such that it performs a helical winding and unwinding movement in one plane. The metal hose 13 used here is liberated from all other movements. In this way, a torsional stress additionally occurring in the metal hose 13 can be prevented, which would considerably contribute to the material fatigue. Such metal hose 13 is pressure-resistant and vacuum-tight without additional seals and thus is also permanently resistant to liquid salts at temperatures above 500° C.

In the region of the end 4b of the absorber tube 4, which is located opposite the metal hose 13, a bearing correspondingly is provided, which permits an expansion of the absorber tube 4 in a direction parallel to the rotation axis A and hence along its longitudinal extension. This is realized by means of plain bearings 17, via which the absorber tube 4 is rotatably mounted on the connection structure 5 in the region of the end 4*b*. In addition, the connection structure 5 provided at the end 4*b* of the absorber tube 4 is pivotably mounted about the pivot bearing 1 along the rotation axis A.

For connection with the succeeding absorber tube 4 of the next parabolic trough mirror 12, an axial compensator 14 is shown in FIG. 4 as connection means. This axial compensator 14 in the form of a metallic bellows compensator connects the two absorber tubes 4, 4 in alignment with each other and permits the compensation of the longitudinal thermal expansion 10 parallel to the rotation axis A. Due to the synchronous course of the pivoting movements 6, 6 of the two absorber tubes 4, 4 the axial compensator 14 hence experiences no bending forces transverse to the rotation axis A or transverse to the longitudinal axis of the absorber tubes 4, 4. Since a maximum of synchronous running always is ensured during operation, the axial compensator 14 will only be loaded by the intended (longitudinal) movement under operating conditions, and there is no risk of stresses due to torsion. Seals are not necessary inside the axial compensator 14, so that here as well a durable design for most sophisticated carrier fluids, which must be passed through the axial compensator 14, is easily possible.

An alternative configuration variant is shown in FIGS. 5A to 5C. In a perspective side view corresponding with FIG. 4, the same represent the solar-thermal installation, with a difference consisting in the design of the connection of the two absorber tubes 4, 4. Instead of an axial compensator 14, a U-shaped arrangement or U-shape 11 of two flexible metal hoses 111 and 112 is chosen, which is provided between the connection structure 5 of the one absorber tube 4 and the connection structure 5 of the other absorber tube 4. The metal hose 111 is connected with the end 4*b* of the one absorber tube 4 (the left one in FIG. 5A) and the metal hose 112 is connected with the end 4*b* of the other absorber tube 4 (the right one in FIG. 5A).

The two metal hoses 111 and 112 each form one of the opposed legs of the U-shape 11 and are connected with each other via a rigid tube line piece 110 at the base of the U-shape 11. In the operating condition shown in FIG. 5A, the metal hoses 111, 112 extend substantially parallel to each other and vertical from the longitudinal axis of the absorber tubes 4, 4 in direction of the rotation axis A.

In the middle of their longitudinal extension, the metal hoses 111, 112 each are enclosed by a holding frame 50 and are passed through the holding frame 50, respectively. This holding frame 50 is rigidly connected with the respective connection structure 5, so that it can be swivelled about the rotation axis A together with the connection structure 5 and the absorber tube 4. During the pivoting movement 6 about the rotation axis A, this supports the entrainment of the metal hoses 111 and 112 and additionally prevents that the metal hoses 111 and 112 are rotated and thereby subjected to torsion.

Rather, due to the explained bearing of the absorber tubes 4, 4 the metal hoses 111 and 112 each only experience forces which as a result of the unilateral longitudinal thermal expansion 10 of the absorber tubes 4, 4 act parallel to the rotation axis A and must be compensated. Consequently, an introduction of force into the metal hose 111, 112 each is effected only at its connection with the end 4*b* of the absorber tube 4 along the longitudinal axis of the absorber tube 4 aligned with the rotation axis A. Proceeding from the operating condition shown in FIG. 5A this can mean that the absorber tube 4 to be cooled contracts and hence a force is acting parallel to the rotation axis A in direction of the end 4*a* or that the absorber tube 4 warming up is expanded and hence a force is acting parallel to the rotation axis A in direction of the other absorber tube 4.

Since the metal hoses 111 and 112 are flexibly connected with each other via the rigid tube line piece 110 at the base of the U-shape 11, the metal hoses 111 and 112 only are subjected to a bending load. Also due to the limitation by the holding frames 50, the metal hoses 111 and 112 therefore will only bulge in the plane defined by the longitudinal axis of the respective absorber tube 4 and the rotation axis A, in order to compensate the expansion or contraction of the absorber tubes 4.

A heated condition of the absorber tubes 4,4 proceeding from FIG. 5A is shown in FIG. 5B. Both of the illustrated absorber tubes 4, 4 then experienced a unilateral longitudinal thermal expansion 10 of the absorber tube 4 each in direction of the opposed, aligned absorber tube 4 due to the axial limitation of expansion (fixations 9) in the region of the ends 4*a*.

Thus, the longitudinal thermal expansion 10 leads to an elongation of the absorber tube 4 in the region of the end 4*b*. This elongation can be effected for example exclusively relative to the connection structure 5 at the second end 4*b*, in that a corresponding plain or guide bearing is provided. The absorber tube 4 then would be elongated only relative to the connection structures 5 remaining vertical to the rotation axis A at the end 4*b*. In the present case, however, it is preferred that the connection structure 5 connected with the end 4*b* of the absorber tube 4 can be pivoted along the rotation axis A by means of the pivot bearing 1, in order to permit the unilateral longitudinal thermal expansion 10. When the absorber tube 4 is heated, the connection structure 5 each connected with the absorber tube 4 in the region of the end 4*b* thus is tilted or pivoted in direction of the other absorber tube 4 along the rotation axis A and about the pivot bearing 1 proceeding from the condition illustrated in FIG. 5A.

The metal hoses 111 and 112 are bent corresponding to the occurring load, in order to compensate the forces acting parallel to the rotation axis A. The metal hoses 111 and 112 have been moved closer to each other at the upper ends of the original U-shape 11, while at the base of the original U-shape 11 their distance remains fixed along the rigid tube line piece 110. Correspondingly, they are bent or curved, so that the original U-shaped 11 is broader below the holding frames 50 and the defined space between the metal hoses 111 and 112 and the tube line piece 110 rather turns out to be bell-shaped.

In an alternative configuration it would also be conceivable to form the original U-shape 11 by a single continuous metal hose. Furthermore, the holding frame 50 can be open in axial direction, i.e. parallel to the rotation axis A, since it decisively contributes to the entrainment of the metal hoses 111, 112 in direction of rotation.

FIG. 5C shows a cooled or cooler condition of the solar-thermal installation proceeding from FIG. 5A. The two opposed connection structures 5, 5 of the two interconnected parabolic trough mirrors 12, 12 again are mounted such that they are in a position to be swivelled or tilted both towards each other and away from each other and hence in direction of the center of the associated parabolic trough mirror 12.

In case of a change of the longitudinal expansion of the absorber tube 4, the connection structure 5 hence is pivoted at the end 4*b* along the rotation axis A. The fixation 9 in the region of the end 4*a* and the connection structure 5 exclusively transmitting the pivoting movement 6 permit no change in length of the absorber tube 4 at the end 4*a*. A unilateral longitudinal thermal expansion 10 of the absorber tube 4 as a result of a change in temperature thus is ensured by the connection structure 5 supported via the pivot bearing 1.

In the illustrated representation of FIG. 5C, the absorber tube 4 each has contracted, so that the connection structure 5 pivotally mounted via the pivot bearing 1 each is tilted in direction of the other connection structure 5 of the corresponding parabolic trough mirror 12. The metal hoses 111, 112 mounted between the two parabolic trough mirrors 12, 12 for connecting the absorber tubes 4, 4 permit such tilting of the pivotally mounted connection structures 5, 5 between the two parabolic trough mirrors 12, 12 and compensate the occurring forces parallel to the rotation axis A. Therefore, they differ from the U-shape 11 as warmer initial condition shown in FIG. 5A and substantially form a V-shape.

Analogously, upon heating the absorber tubes 4, 4 the upper end of the pivotally mounted connection structure 5, which is connected with the respective absorber tube 4, is moved in direction of the other parabolic trough mirror 12. In case of a change in length of one or both of the absorber tubes 4, 4, the ends of the pivotally mounted connection structures 5, 5 connected with the absorber tubes 4, 4 of the associated parabolic trough mirrors 12, 12 hence are guided towards each other or away from each other along the rotation axis A. Correspondingly, the metal hoses 111 and 112 together with the tube line piece 110 then substantially form a V-shape which is shown in FIG. 5C, or are similar to a V-shape rotated by 180 degrees, or an A-shape, which is shown in FIG. 5B.

Alternatively, only one single continuous flexible metal hose can also be provided here, which connects two absorber tubes 4, 4 with each other.

At the plain bearing 17 in the region of the end 4b of the absorber tube 4 a fixation 9 likewise can be provided for coupling to the connection structure 5, so that a unilateral longitudinal thermal expansion 10 immediately and directly acts on the pivotally mounted connection structure 5 and causes tilting thereof about the pivot bearing 1. Alternatively, it can be provided that only after a specified longitudinal thermal expansion 10 or contraction of the absorber tube 4, the absorber tube 4 is brought in contact with the pivotally mounted connection structure 5 such that the connection structure 5 is pivoted. For this purpose, for example a stop at the absorber tube 4 initially spaced from the connection structure 5 would be conceivable, which only with a sufficient elongation or contraction of the absorber tube 4 comes to rest against the connection structure 5.

Furthermore, it can be provided that the mounting condition of the solar-thermal installation corresponds to the condition shown in FIG. 5C by way of example and proceeding therefrom, the warmer condition shown in FIG. 5A is taken in operation.

In any case, when compensating forces parallel to the rotation axis A or forces which lie in a plane parallel to the rotation axis A, no further seal is necessary in this portion of the connection system due to the use of flexible metal hoses.

Another alternative configuration variant is shown in FIG. 6. In this Figure, a compensator joint system 16* is provided instead of the U-arrangement of one or two flexible metal hoses 111, 112 for connection of the two absorber tubes 4, 4.

There are used two tube lines 40 bent in a Z-shaped manner, which have a middle portion which is many times longer than the bent initial and end portions. The initial portion each is connected with the end 4b of the absorber tube 4 via a compensator 161. Via a further compensator 161, the end portion each is connected with a short rigid and straight tube line 40c, via which the two tube lines 40, 40 thus are connected.

The compensator joint system 16* thus formed likewise lies in the plane defined by the longitudinal axis or the direction of extension of the absorber tubes 4, 4 and the rotation axis A. The middle portion of the tube line 40 likewise is each guided through a holding frame 50 of the connection structure 5.

Via the compensators 161 known from the prior art, which in particular are designed especially for the forces occurring axially, i.e. parallel to the rotation axis A and/or along the direction of extension of the absorber tube 4, and due to the described arrangement of the tube lines 40, 40 the compensator joint system 16* is able to compensate the bilateral longitudinal thermal expansion 10. Seals susceptible to wear can be omitted.

Said flexible metal hoses 13, 111, 112 furthermore are corrugated all-metal hoses, in particular multi-wall corrugated metal hoses. Instead of flexible metal hoses as connection means between the parabolic trough mirrors 12 or parabolic trough mirror units, it is perhaps also conceivable to use elastic elements which under load apply a counteracting restoring force.

For the compensators 14 and 161, bellows compensators normally are used, which like the metal hoses are pressure-resistant and vacuum-tight without any seal.

In the illustrated configuration variants of FIGS. 4-6 it thus is essential that the absorber tube 4 as line tube of the solar-thermal installation is mounted such that at each end 4a, 4b of the absorber tube 4 only a specific and not superimposed loading condition is present substantially in a single plane. For this purpose, it can be provided in addition to correspondingly also fix or mount the fixed line 15 such that in the case of an expansion or contraction it only expands or contracts at the end which is located opposite the end 13a of the flexible metal hose 13.

For the pure bending during the pivoting movement 6 it thus becomes possible to incorporate a well-tried metal hose 13 and for absorbing the thermal expansion 10 of the absorber tube 4, as connection means from one mirror unit to the other, an axial compensator 14 (FIG. 4), in particular a construction loaded by external pressure, at least one second metal hose 111, 112 in a U-shaped arrangement 11 (FIG. 5A-C) or a joint system of metal compensators 16* (FIG. 6).

The connection means exclusively absorb the unilaterial thermal expansion 10 of the connected absorber tube 4 in one plane and no other movements.

The consequence of this connecting system is that these elements, hose 111, 112, tube line 40, 40c or compensators 161, also are loaded only by the intended movement under operating conditions and there is no risk of stresses due to torsion. In this way, an easily calculable service life and a high safety against premature failure are achieved.

The described configuration variants are described in connection with parabolic mirrors 12 as part of a solar collector unit. In principle, embodiments of the invention can also be used in other types of solar-thermal power plants which include a pivotable line tube with a carrier fluid that is heated by the solar radiation. Other arrangements of the solar collectors are also possible in principle.

The invention is not limited in its configuration to the preferred embodiments described above. Rather, a number of variants are conceivable, which also make use of the device in accordance with the invention in basically different configurations.

The invention claimed is:

1. A connecting system for a line tube of a solar thermal installation, comprising: a line tube having a first end and a second end, a metal hose used as a flexible tube connection to connect a first end of the line tube to a stationary fixed line, and at least one connection means to connect the second end of the line tube to a further connecting system, wherein, the connecting system for the line tube is pivotable about an axis of rotation, the line tube transports carrier fluid from the first end of the line tube to the second end of the line tube, the at least one connection means includes at least one flexible metal hose which is a part of a U-shaped arrangement positioned between the two connecting systems, a first end of the connection means is connected to the second end of the line tube and a second end of the connection means is connected to a rigid line tube, which forms another part of the U-shaped arrangement, in the region of each of the two ends of the line tube, a connection structure is positioned on the line tube and is pivotally mounted about the rotation axis together with the line tube, the connection structure facing the connection means additionally is pivotally mounted along the rotation axis, and a holding frame is positioned on at least the connection structure facing the connection means, wherein the holding frame extends around the at least one connection means and is pivotable with the connection structure.

2. The connecting system according to claim 1, wherein the line tube is mounted such that in the case of a thermal expansion along the direction of extension of the line tube, the line tube can expand only in direction of its second end.

3. The connecting system according to claim 2, wherein as a result of a thermal expansion of the line tube along the direction of extension of the line tube the connection structure pivotally mounted along the rotation axis can be pivoted along the rotation axis.

4. The connecting system according to claim 1, wherein the line tube is fixed in its direction of extension in the region of its first end and is slidingly guided in the region of its second end.

5. The connecting system according to claim 1, wherein the fixed line is mounted or fixed such that in the case of an expansion or contraction it is only expanded or contracted at an end opposite to the metal hose.

6. The connecting system according to claim 1, wherein inside the connecting system, proceeding from the fixed line up to the further connecting system, no seals are necessary.

7. The connecting system according to claim 1, further including two flexible interconnected metal hoses, which each form a leg of the U-shape consisting of two legs.

8. The connecting system according to claim 1, wherein the flexible metal hose or one of the tube lines is guided in a holding frame which along with the line tube performs the pivoting movement about the rotation axis.

9. The connecting system according to claim 1, wherein the line tube is an absorber tube of the solar-thermal installation, in which energy is supplied to the carrier fluid via solar collectors.

10. The connecting system according to claim 1, wherein the solar-thermal installation includes parabolic trough mirrors which can be pivoted about the rotation axis.

* * * * *